(12) United States Patent
Branciforte et al.

(10) Patent No.: US 12,493,553 B2
(45) Date of Patent: Dec. 9, 2025

(54) CROSS-CORE INVALIDATION SNAPSHOT MANAGEMENT

(71) Applicant: International Business Machines Corporation, Armonk, NY (US)

(72) Inventors: Richard Joseph Branciforte, Austin, TX (US); Gregory William Alexander, Pflugerville, TX (US); Timothy Bronson, Round Rock, TX (US); Deanna Postles Dunn Berger, Hyde Park, NY (US); Akash V. Giri, Austin, TX (US); Aaron Tsai, Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 595 days.

(21) Appl. No.: 17/821,609

(22) Filed: Aug. 23, 2022

(65) Prior Publication Data

US 2024/0070075 A1    Feb. 29, 2024

(51) Int. Cl.
G06F 12/08        (2016.01)
G06F 12/0842      (2016.01)

(52) U.S. Cl.
CPC ...... G06F 12/0842 (2013.01); *G06F 2212/62* (2013.01)

(58) Field of Classification Search
CPC ............. G06F 12/0811; G06F 12/0842; G06F 12/0817; G06F 12/084; G06F 2212/1008; G06F 2212/1024; G06F 2212/502; G06F 2212/62
See application file for complete search history.

(56) References Cited

U.S. PATENT DOCUMENTS

| | | | |
|---|---|---|---|
| 8,041,894 B2 | 10/2011 | Krumm | |
| 10,795,824 B2 | 10/2020 | Berger | |
| 10,949,351 B2 | 3/2021 | Recktenwald | |
| 2009/0240889 A1* | 9/2009 | Choy | G06F 12/0815 711/E12.024 |
| 2017/0192895 A1* | 7/2017 | Li | G06F 12/0871 |
| 2019/0251030 A1* | 8/2019 | Recktenwald | G06F 12/1054 |

FOREIGN PATENT DOCUMENTS

| | | | | |
|---|---|---|---|---|
| EP | 3001308 B1 | * | 12/2017 | ............... G06F 9/38 |
| TW | 1506552 B | * | 11/2015 | ............... G06F 9/44 |

OTHER PUBLICATIONS

Brenza, JG, "Cross-Interrogate Directory for a Real, Virtual or Combined Real/Virtual Cache," An IP.com Prior Art Database Technical Disclosure, IP.com No. IPCOM000042312D, IP.com Electronic Publication Date: Feb. 3, 2005, 2 pages.
"IBM z16 puts innovation to work while unlocking the potential of your hybrid cloud transformation," IBM United States Hardware Announcement 122-001, Apr. 5, 2022, 146 pages. https://www.ibm.com/common/ssi/ShowDoc.wss?docURL=/common/ssi/rep_ca/1/897/ENUS122-001/index.html.

* cited by examiner

Primary Examiner — Tracy C Chan
(74) Attorney, Agent, or Firm — Randy Tejeda

(57) ABSTRACT

A lower-level cache managing cross-core invalidation (XI) snapshots in a shared-memory multiprocessing system, wherein the management of XI snapshots reduces an amount of required snapshots while allowing shared lower-level caches, comprising: the lower-level cache maintaining respective response sync state for at least one processor in a plurality of processors signifying that a line may have been changed by another processor since last fetched by a requesting processor.

20 Claims, 5 Drawing Sheets

CROSS-CORE INVALIDATION SNAPSHOT MANAGEMENT

STATEMENT REGARDING PRIOR DISCLOSURES BY THE INVENTOR OR A JOINT INVENTOR

The following disclosure(s) are submitted under 35 U.S.C. 102(b)(1)(A):
(i) IBM Z16 platform; Richard J. Branciforte, Gregory W. Alexander, Timothy Bronson, Deanna Postles Dunn Berger, and Akash V. Giri; Apr. 5, 2022.

BACKGROUND

The present invention relates generally to the field of symmetric multiprocessing, and more particularly to cross-core invalidation snapshots.

Symmetric multiprocessing or shared-memory multiprocessing (SMP) involves a multiprocessor computer hardware and software architecture where two or more identical processors are connected to a single, shared main memory, have full access to all input and output devices, and are controlled by a single operating system instance that treats all processors equally, reserving none for special purposes. Most multiprocessor systems today use an SMP architecture. In the case of multi-core processors, the SMP architecture applies to the cores, treating them as separate processors.

SUMMARY

Embodiments of the present invention disclose a computer-implemented method, a computer hardware product, and a system. The computer-implemented method includes a lower-level cache managing cross-core invalidation (XI) snapshots in a shared-memory multiprocessing system, wherein the management of XI snapshots reduces an amount of required snapshots while allowing shared lower-level caches, comprising: the lower-level cache maintaining respective response sync state for at least one processor in a plurality of processors signifying that a line may have been changed by another processor since last fetched by a requesting processor.

DETAILED DESCRIPTION

Figure 1:
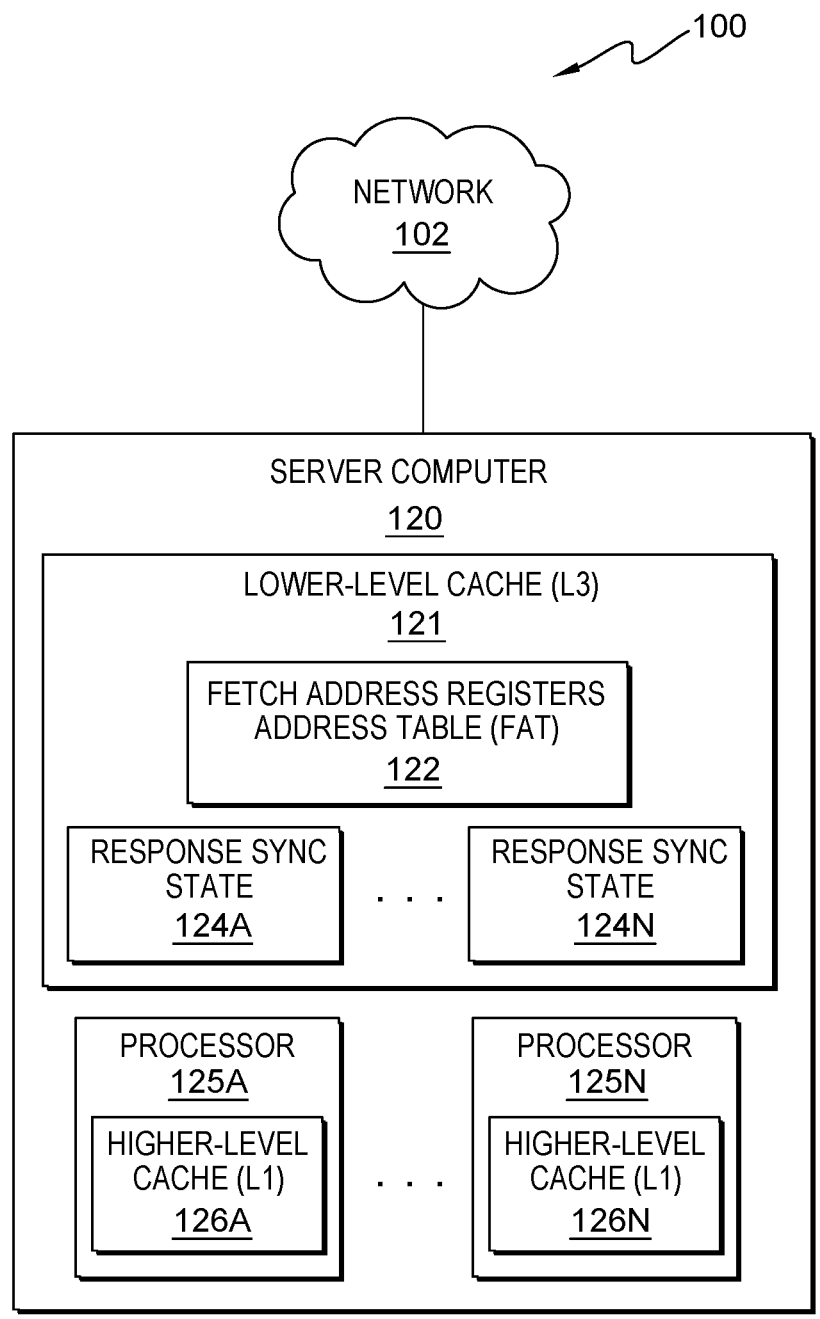
FIG. 1 (i.e., FIG.) is a functional block diagram illustrating a symmetric multiprocessing or shared-memory multiprocessing (SMP) environment, in accordance with an embodiment of the present invention.

In large distributed symmetric multiprocessing or shared-memory multiprocessing (SMP) systems, where a plurality of processors or cores have direct access to all main memory in the system, cache coherence is a necessary requirement despite being computationally costly to maintain. Cache coherence ensures that any change in the data of one cache is reflected by some change to all other caches that may have a copy of the same global data location. Cache coherence guarantees that any data load or store to a processor register, if acquired from the local cache, will be correct, even if another processor is using the same data. Often it is desirable (i.e., increased performance gains, etc.) to delay coherency synchronization as long as possible. For this reason, a mechanism called cross-invalidate (XI) snapshotting is commonly utilized to ensure cache coherency through requiring all pending or delayed cross-XI requests to be processed before new data, which could have been modified by another core or by input/output (I/O), is consumed. Prior implementations and systems perform an XI snapshot responsive to data (e.g., line) brought into a core private cache forcing such prior systems to be dependent on a cache footprint. This dependence creates a need for XI snapshot management with shared lower-level caches, which prior implementations and systems have not accomplished.

Current systems and prior implementations do not have capabilities to perform absolute address (i.e., memory address) comparisons between higher-level cache (L1) fetch controllers respectively associated with each core in the plurality of cores. This lack of absolute address comparison allows multiple L1 fetch address registers (FARs) to share validity for the same absolute address, leading to a scenario where a first L1 FAR receives a response sync indication or signal, described further in response sync state 124, however, lower-level cache (L3) misses to the same absolute address can "tunnel" around the first L1 response sync and not execute a required XI snapshot. Said tunneling occurs due to an initial fetch clearing the response sync in an associated cache directory responsive to the transmission of the response sync signal to a requesting core resulting in a fetch returning stale data to the L1. This fetch of stale data results from non-executed outstanding XIs to a core that has not been processed by an associated, updated L1.

Embodiments of the present invention allow for cross-invalidate (XI) snapshotting in SMP systems with shared or semi-shared caches by providing an interlock allowing shared lower-level caches while asserting response sync indications for tunneled fetches. Embodiments of the present invention enable XI snapshotting in shared cache environments by monitoring for changes to one or more lines within the shared cache and responsive to a line that may have mutated, changed, or been modified since its delivery to a higher-level cache, performing an XI snapshot to process all previously delayed invalidates before utilizing or consuming the updated line. Embodiments of the present invention utilize response sync states and a fetch address registers address table (FAT) to reduce performance penalties of blocking a fetch from exiting a core by allowing said fetch to proceed out of the core, while instructing the core to execute an XI snapshot (i.e., snapshotting an XI vector). In a further embodiment, each respective response sync state is associated with a line comprised within the lower-level cache. Embodiments of the present invention improve computational performance of SMP systems by reducing or delaying required XI snapshots while allowing larger caches in the form of shared or semi-shared caches. In this embodiment, the XI snapshot delays the completion of any instructions using the fetched line until after any invalidations received by the L1 prior to the XI snapshot have been processed. Implementation of embodiments of the invention may take a variety of forms, and exemplary implementation details are discussed subsequently with reference to the Figures.

The present invention will now be described in detail with reference to the Figures.

FIG. 1 is a functional block diagram illustrating a symmetric multiprocessing or shared-memory multiprocessing (SMP) environment, generally designated 100, in accordance with one embodiment of the present invention. The term "environment" as used in this specification describes a computer system that includes multiple, physically, distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

SMP environment 100 includes server computer 120 connected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between server computer 120 and other computing devices (not shown). In various embodiments, network 102 operates locally via wired, wireless, or optical connections and can be any combination of connections and protocols (e.g., personal area network (PAN), near field communication (NFC), laser, infrared, ultrasonic, etc.).

Server computer 120 can be a standalone computing device, a management server, a web server, a mobile computing device, or any other electronic device or computing system capable of receiving, sending, and processing data. In other embodiments, server computer 120 can represent a server computing system utilizing multiple computers as a server system, such as in a cloud computing environment. In another embodiment, server computer 120 can be a laptop computer, a tablet computer, a netbook computer, a personal computer (PC), a desktop computer, a personal digital assistant (PDA), a smart phone, or any programmable electronic device capable of communicating with other computing devices (not shown) within SMP environment 100 via network 102. In another embodiment, server computer 120 represents a computing system utilizing clustered computers and components (e.g., database server computers, application server computers, etc.) that act as a single pool of seamless resources when accessed within SMP environment 100. In the depicted embodiment, server computer 120 includes lower-level cache 121 and processor 125A through processor 125N. In other embodiments, server computer 120 may contain other applications, databases, programs, etc. which have not been depicted in SMP environment 100. Server computer 120 may include internal and external hardware components, as depicted, and described in further detail with respect to FIG. 5.

Lower-level cache (L3) 121 is a cache shared between processor 125A through processor 125N. L3 121 contains fetch address registers (FAR) address table (FAT) 122 and response sync state 124A through response sync state 124N.

Fetch address registers (FAR) address table (FAT) 122 is a L3 121 table for the state of cache responses sent from L3 121 to one or more processor 125, where FAT 122 is a dedicated, physical structure within L3 121. In the depicted embodiment, FAT 122 resides on server computer 120 within L3 121. In a further embodiment, FAT 122 is stored within L3 121 or shared cache of a multi-processor server computer 120. In an embodiment, processor 125A through processor 125N, respectively comprising higher-level cache (L1) 126, allocates an entry in FAT 122 responsive to every fetch associated with processor 125A through processor 125N (i.e., cores, computer processors, etc.), wherein L3 121 records an entry for every line fetched (e.g., returned) from L3 121. In an embodiment, FAT 122 stores XI snapshot indications and information in a table comprising a plurality of rows representing fetches and a plurality of columns comprising respective ids or address values and validation parameters for each fetch. In some embodiments, L3 121 maintains separate tables for L1 126A through L1 126N, each comprising entries with a validity parameter and an associated L3 121 identifier (e.g., absolute address, hashed absolute address, or L3 121 location (i.e., congruence class, compartment, etc.)). In an embodiment, L3 121 utilizes FAT 122 to track a plurality of L1 Fetch Address Registers (FARs) that require an XI snapshot but have not yet completed the XI snapshot. Here, for each L1 FAR, L3 121 saves and stores respective absolute addresses responsive to a response sync that was sent "naturally" (i.e., not due to a table hit), or due to a hit in FAT 122.

In an embodiment, if an earlier fetch needs to send a response sync indication back to the requesting core, any outstanding fetches will trigger a response sync indication, excluding indications caused by FAT 122 hits and sent to the core, thus responsively, L3 121 sets the associated validation parameter to initiate a subsequent XI snapshot. In various embodiments, the validation parameter is observed to be set for any number of earlier fetches that share a corresponding absolute address as long as the original L1 FAR is still valid (i.e., a FAT 122 hit). In these embodiments, a response sync indication is created as a result of a FAT 122 hit, this action alone does not normally result in the setting of the validation parameter. In a further embodiment, there is configurability to change this behavior such that a response sync indication that was caused as a result of a FAT 122 forces the setting of the validation parameter in the table and subsequent, detecting one or more FAT 122 hits on subsequent fetches so long as the L1 FAR is still valid for the fetch that detected the FAT 122 hit. Here, a hit that occurs in conjunction with another reason for asserting response sync indication results with setting the validation parameter. FIG. 4B further illustrates FAT 122.

Response sync state (resp_sync or directory resp_sync) 124A through response sync state 124N, also referred as resp_sync bits, are each associated with respective a line in a respective directory of L3 121 for a plurality of processor 125 (i.e., processor 125A through processor 125N (e.g., cores, etc.)) within server computer 120. In an embodiment, resp_sync 124 has a signal counterpart (i.e., response sync indication or resp_sync indication) that is returned to L1 126 with a requirement for an XI snapshot. Control of resp_sync state 124 by L3 121 maintains XI snapshotting with shared cache systems. Resp_sync state 124 is represented by a bit that indicates whether the line has changed since last fetched by an associated processor 125 from L3 121. A positive, true, or set resp_sync state 124 indicates an initiation of an XI snapshot may be required to maintain coherency. Resp_sync 124 controls (e.g., delay) XI snapshotting subject to a plurality of factors described within flowcharts 200 and 300. In an embodiment, L3 121 transmits resp_sync state 124 as a resp_sync indication, allowing communication and regulation of XI snapshot initiations and delays between L3 121, L1 126, and processor 125.

In an embodiment, L3 121 adds resp_sync indication to a fetch message responsive to providing a fetch (e.g., line) to L1 126 dedicated to processor 125 (i.e., requesting core), where the added resp_sync indication signals to the requesting core that an XI snapshot is required for the fetch response. In another embodiment, responsive to the line brought into a L3 121 while simultaneously returning to a corresponding L1 126, L3 121 resp_sync indication to L1 126 while setting the directory resp_sync state 124 to false. In yet another embodiment, responsive to a line brought into the L3 121 and not simultaneously returned to the corresponding L1 126, L3 121 sets resp_sync state 124 for the corresponding L1 126 to true (i.e., XI snapshot required). In an embodiment, if a line is brought into L3 121 and delivered to a single processor or core, L3 121 sets resp_sync state 124 to true for all other cores, excluding the requesting core, sending corresponding resp_sync indications. In this embodiment, L3 121 sets resp_sync state 124 to false for the requesting core. In another embodiment, responsive to a core fetch hitting in L3 121, L3 121 returns a resp_sync indication to a corresponding L1 126 (i.e., corresponding to the fetching or requestion processor or core) if an associated resp_sync 124 is set. In this embodiment, L3 121 sets resp_sync state 124 of said core to false.

In yet another embodiment, L3 121 sets resp_sync 124 to true responsive to the line in L3 121 being modified for any reason other than a store for processor 125 corresponding to the resp_sync 124. For example, persistence, I/O store, clear, etc. In an embodiment, responsive to an I/O store operation modifying any stored line, L3 121 sets each resp_sync 124 associated with each processor 125 (i.e., requesting core and remaining (i.e., other) cores) to true. In another embodiment, L3 121 sets all associated resp_sync state(s) 124 to true excluding the resp_sync state 124 associated with a storing processor 125. In an embodiment, resp_sync is an indication to a core that the line may have been modified since the last resp_sync indication returned to said core for said line, excluding a current fetch. In this embodiment, the signal is returned by L3 121 for a plurality of factors including L3 misses, or a target line hit in L3 that is returned exclusive (EX). However, L3 121 requires any read-only (RO) XIs to be sent to a local core, triggering the core to snapshot a queue of outstanding invalidates.

Processor 125A through processors 125N are representative of a plurality of processors in SMP environment 100, each sharing L3 121. An instance of processor 125 that is requesting, or fetching is a requesting processor 125. Processor 125A through processors 125N, respectively, comprise higher-level cache (L1) 12A through higher-level cache (L1) 126N.

Higher-level cache (L1) 126A through higher-level cache (L1) 126A are representative of a plurality of higher-level caches, respectively, dedicated to processor 125 through processors 125N. L1 126A through L1 126N initiate XI snapshots responsive to a set resp_sync indication, as described in resp_sync 124.

In an embodiment, L3 121 and processors 125A through processors 125N (i.e., L1 126A through L1 126N) are comprised within an, abstracted, interlock, further comprised within server computer 120. Said interlock controls (e.g., initiates or delays) XI snapshots in a shared cache environment through implemented logic within L3 121 and L1 126A through L1 126N. Said interlock may implement the following steps: a lower-level cache managing cross-core invalidation (XI) snapshots in a shared-memory multiprocessing system, wherein the management of XI snapshots reduces an amount of required snapshots while allowing shared lower-level caches, comprising: the lower-level cache maintaining respective response sync state for each processor in a plurality of processors signifying that a line may have been changed by another processor since last fetched by a requesting processor. These steps are further depicted and described in further detail with respect to FIGS. 2 and 3.

Figure 2:
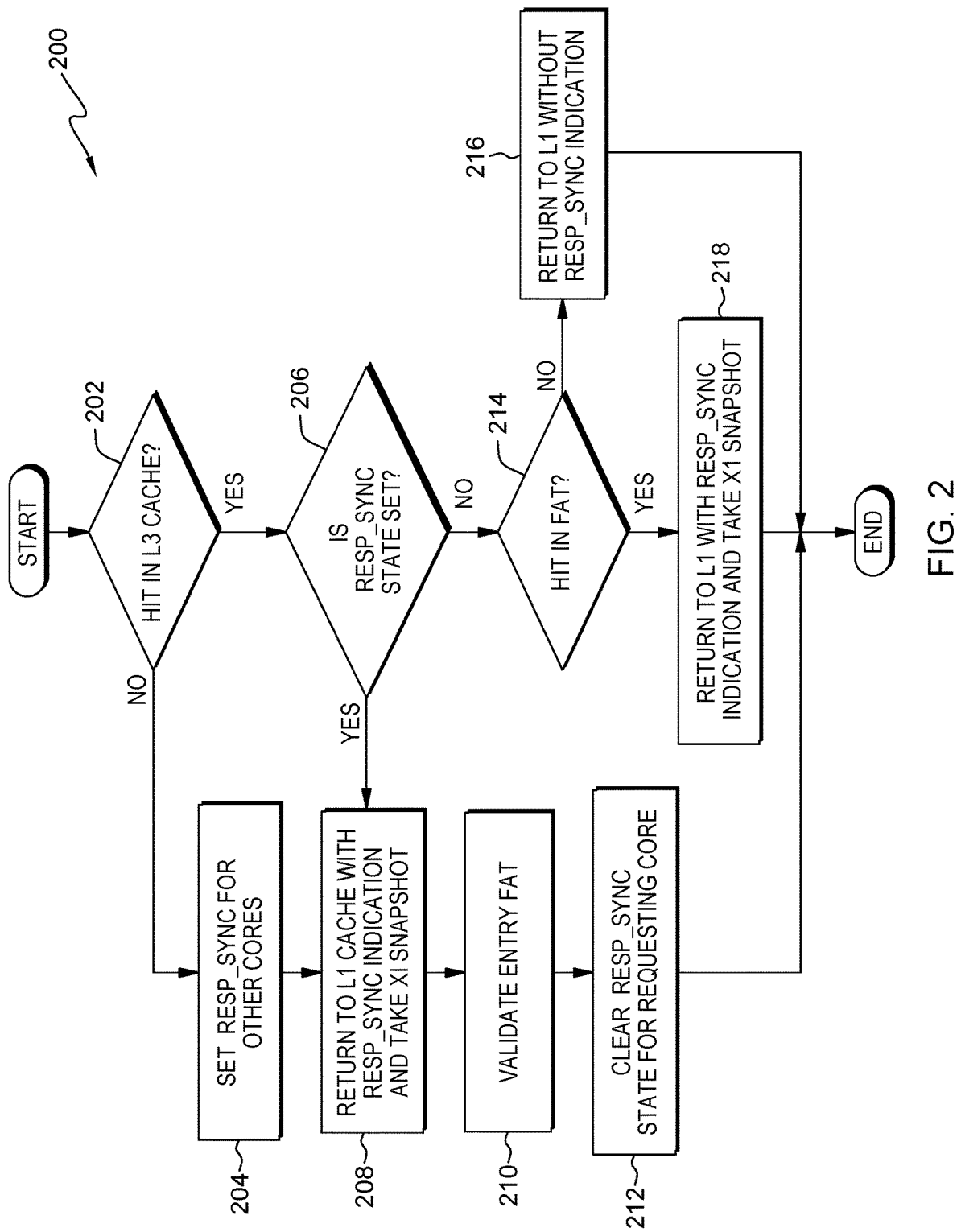
FIG. 2 is a flowchart depicting operational steps of an interlock, on a server computer within the SMP environment of FIG. 1, for shared cache XI snapshot management with a fetch address table (FAT), in accordance with an embodiment of the present invention.

FIG. 2 depicts flowchart 200 illustrating operational steps of an interlock for XI snapshot management with a fetch address table, in accordance with an embodiment of the present invention.

L3 121 initiates responsive to a fetch request or a fetch stage in a CPU cycle from processor 125 within SMP environment 100. If a hit occurs in a lower-level cache (L3) ("yes" branch, decision block 202), then the L3 checks a response sync state (decision step 204). In an embodiment, a hit is a cache hit where data (e.g., cache block and cache lines) requested for processor 125A through 125N, core, component, or application is found within a specified cache or cache level (e.g., L3, lower-level cache, lowest-level cache, or shared cache). In this embodiment, resp_sync state 124 indicates whether data (i.e., comprised line) has changed or has been modified since it was last fetched.

If a miss occurs in a shared cache (i.e., L3) ("no" branch, decision block 202), then the L3 sets the resp_sync state for other cores (step 204). In an embodiment, responsive to a miss or a non-hit in L3 121 due to a fetch by a requesting processor 125, L3 121 sets a corresponding resp_sync state 124 for each other or non-requesting processor 125 (i.e., every processor 125 or core that is not the requesting processor 125) to true (i.e., setting the resp_sync bit to "1").

L3 returns to a L1 with resp_sync indication (step 208) and takes an XI snapshot. In an embodiment, the returned response sync indication to L1 126, by L3 121, corresponding to the requesting processor 125, with the fetch response signals that the XI snapshot is required, and responsively, L1 126 initiates the XI snapshot by processor 125.

L3 121 validates the entry in fetch address table (FAT) (step 210). In an embodiment, responsive to L3 121 returning to L1 126, processor 125 validates the XI snapshot by comparing it to a plurality of entries within FAT 122. L3 121 maintains a FAT entry for every L3 fetch entry indexed by XI snapshot identifier (such as L1 FAR), where each FAT entry has a validity parameter and a L3 121 identifier such as an absolute address or L3 121 location. In an embodiment, responsive to a fetch sent to L1 126 with a resp_sync indication due to L3 121 miss or a set L3 121 resp_sync state, L3 121 validates the fetch with a corresponding FAT entry that identifies the returned line. In a further embodiment, responsive to every fetch that enters L3 121, L3 121 compares the absolute address of the fetch to each entry in FAT 122. In an embodiment, an entry in FAT 122 is considered valid if the given L1 FAR is valid and L3 121 has sent a response sync indication for that associated FAR.

In an embodiment, subsequent fetches are compared against valid entries in FAT 122. Responsive to a matching identifier, L3 121 sends a resp_sync indication to the L1 126. Responsively, L3 121 initiates an XI snapshot to each processor 125 with a returned set resp_sync indication and associated set resp_sync state 124. In an embodiment, responsive to an XI snapshot completion, L1 126 or processor 125 sends an indication of XI snapshot completion to FAT 122 and invalidates the corresponding entry in FAT 122. In another embodiment, L1 126 or processor 125 sends the XI snapshot completion indication at L1 FAR retirement. In some embodiments, L3 121 validates a FAT 122 entry will be validated responsive to a set resp_sync indication responsive to a hit in FAT 122.

L3 121 clears resp_sync state for requesting core (step 212). In an embodiment, responsive to a validated entry, L3 121 clears resp_sync state 124 (e.g., sets the state to false) for the requesting processor 125.

If the resp_sync state is set ("yes" branch, decision block 206), then L3 returns the fetch to a L1 cache with the set resp_sync indication (step 208). In an embodiment, L3 121 returns the fetch to L1 126 corresponding to the requesting processor 125 with a resp_sync indication and the fetch response, where the resp_sync indication requires an XI snapshot.

If the resp_sync state is not set ("no" branch, decision block 206), then L3 determines if there is a hit in the FAT (decision block 214). In an embodiment, L3 121 determines that a hit in FAT 122 occurs if an incoming fetch address matches an address already presented in an entry within FAT 122 and if the entry in the table is valid.

In an embodiment, responsive to a fetch sent to a L1 with a resp_sync indication due to a L3 miss or L3 directory resp_sync state, L3 121 validates the fetch with a corresponding FAT entry that identifies the returned line. In an embodiment, subsequent fetches are compared against valid entries in FAT 122. Responsive to a matching identifier, L3 121 sends a resp_sync indication to L1 126.

If there is no hit in the FAT ("no" branch, decision block 214), then L3 returns the fetch to L1 without set resp_sync (step 216). In an embodiment, L3 121 returns to the L1 126 of the requesting processor 125 with the fetched line or requested data without a set resp_sync indication or a false resp_sync indication, allowing the core to continue operations without an XI snapshot, thus conserving computational resources and increasing system performance.

If there is a hit in the FAT ("yes" branch, decision block 214), then L3 121 returns to L1 cache with resp_sync indication set and takes an XI snapshot (step 218). Responsive to a hit in FAT 122, L3 121 attaches a resp_sync indication to the incoming fetch to require a set a subsequent XI snapshot. In an embodiment, responsive to an XI snapshot completion, processor 125 sends an indication of XI snapshot completion to FAT 122 in L3 121 and invalidates (e.g., unsets the validation parameter) the corresponding entry in FAT 122.

Figure 3:
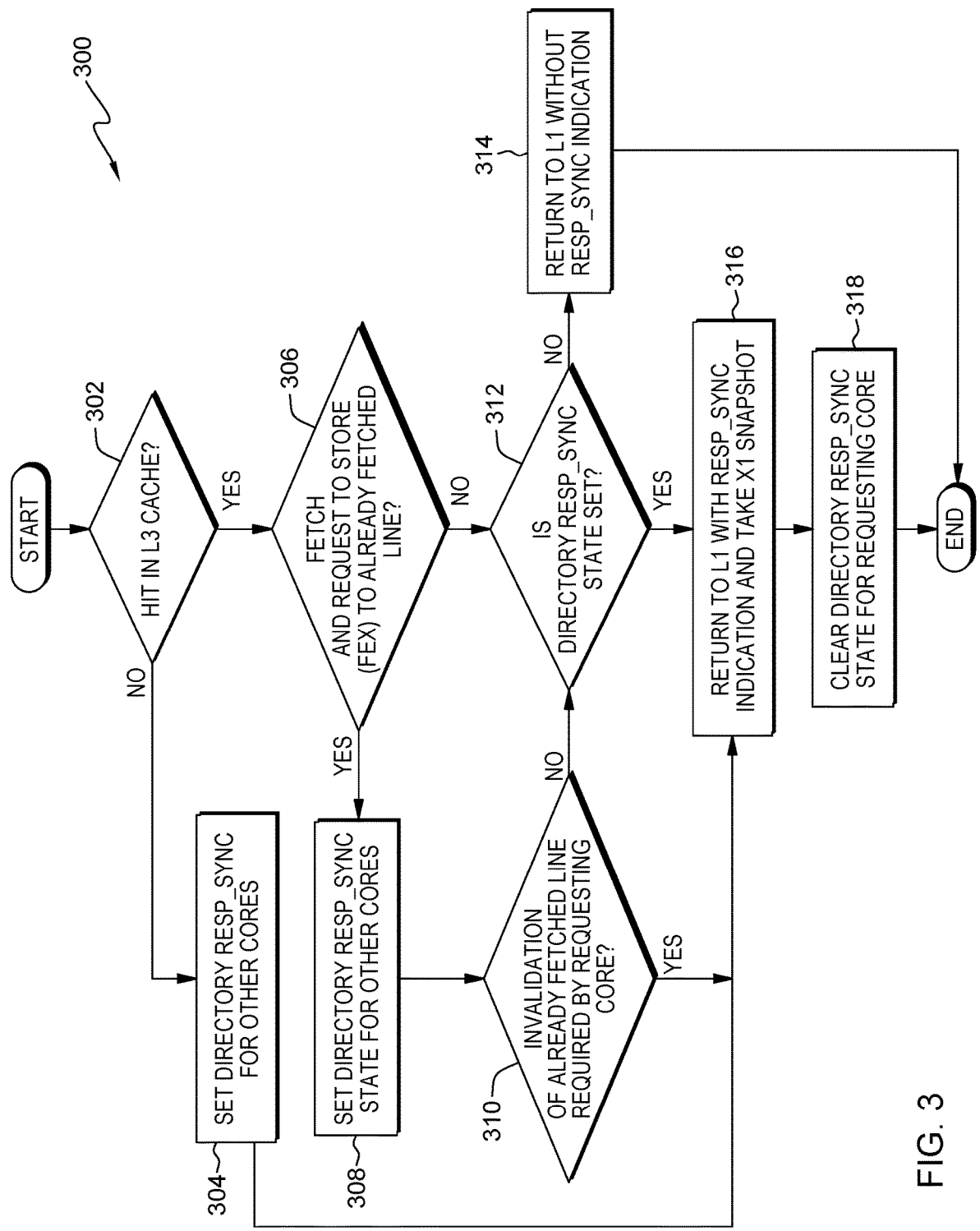
FIG. 3 is a flowchart depicting operational steps of the interlock, on the server computer within the SMP environment of FIG. 1, for shared cache XI snapshot management with store-hit-load (SHL) considerations, in accordance with an embodiment of the present invention.

FIG. 3 depicts flowchart 300 illustrating operational steps of an interlock for XI snapshot management with Store-Hit-Load (SHL) considerations, in accordance with an embodiment of the present invention.

Processor 125 initiates responsive to a fetch request or a fetch stage in a CPU cycle from processor(s) 501 within SMP environment 100. If a hit occurs in a L3 ("yes" branch, decision block 302), then L3 121 checks determines if a fetch and request (FEX) has been made to an already fetched line (decision block 306). In an embodiment, L3 121 requires an invalidation when a core fetches and requests authority to store (FEX) to a line that has previously been fetched. In this embodiment, if the line is present in L1 126 in a state that needs to be invalidated then the store that is requesting authority may be architecturally older than the previous fetch (or to a different thread) In a further embodiment, processor 125 initiates an XI snapshot to ensure that the speculative fetch cannot consume stale data after the store completes.

If a miss occurs in a shared cache (i.e., L3) ("no" branch, decision block 302), then L3 sets the resp_sync state for other cores (step 304). In an embodiment, responsive to a miss or a non-hit in the L3 shared cache due to a fetch by a requesting core, L3 121 sets the corresponding resp_sync state 124 for each other core (i.e., every core that is not the requesting core) to true (i.e., setting the bit to "1").

If FEX has been made to an already fetched line ("yes" branch, decision block 306), then L3 121 sets the resp_sync state for other cores (step 308). In an embodiment, responsive to FEX being made to the already fetched line, L3 121 sets the corresponding resp_sync state 124 for each other core (i.e., every core that is not the requesting core) to true (i.e., setting the bit to "1"). In an embodiment, responsively determines whether a read-only (RO) XI was sent as a result from the FEX of an already fetched line. In an embodiment, a RO XI is sent to invalidate an L1 126 copy of the line at a different L1 126 location from a requested L1 126 install location.

If invalidation of the fetched line is required by the requesting core ("yes" branch, decision block 310), then the L3 returns to L1 with resp_sync indication and takes an XI snapshot (step 316). In an embodiment, L3 121 returns to the L1 126 corresponding to the requesting core with the fetch and a resp_sync indication requiring an XI snapshot, responsively, L1 126 or processor 125 initiates an XI snapshot.

If invalidation of the fetched line is not required by the requesting core ("no" branch, decision block 310), then the L3 determines whether a resp_sync state is set (decision block 312). In an embodiment, L3 121 determines if the resp_sync state is set by checking the value of the resp_sync bit (e.g., 1/true, 0/false) or any received resp_sync indication.

If the FEX has not been made to an already fetched line ("yes" branch, decision block 306), then the L3 determines if a resp_sync state is set. (decision block 312). Decision block 312 is described above.

If the directory resp_sync state is not set ("no" branch, decision block 312), then the L3 returns to L1 without a resp_sync indication (step 314). In an embodiment, L3 121 returns to the L1 cache corresponding to the requesting processor 125 without a resp_sync indication signaling that an XI snapshot is not required. Responsively, the requesting processor 125 processes the returned or fetched line without a required XI snapshot or with L1 126 or processor 125 actively delaying XI snapshot.

If the resp_sync state is set ("yes" branch, decision block 312), then the L3 returns to L1 with a resp_sync indication and take an X1 snapshot (step 316). In an embodiment, L3 121 returns to the L1 126 corresponding to the requesting core with the fetch and a resp_sync indication requiring an XI snapshot, responsively, L1 126 or processor 125 initiates an XI snapshot.

L3 clears the resp_sync state for the requesting core (step 318). In an embodiment, responsive to a validated entry, L3 121 clears resp_sync state 124 (e.g., sets the state to false) for the requesting core. Responsively, the one or more cores continue to process data (e.g., store, load, etc.).

Figure 4A:
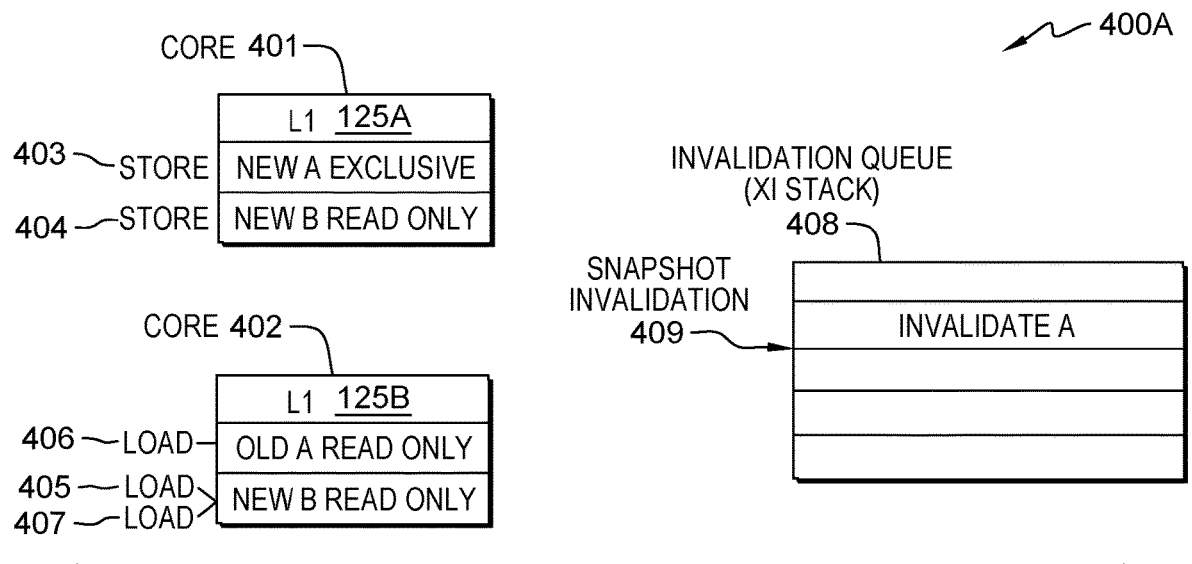
FIGS. 4A, 4B, and 4C are exemplary illustrations, in accordance with an embodiment of the present invention.
Figure 4B:
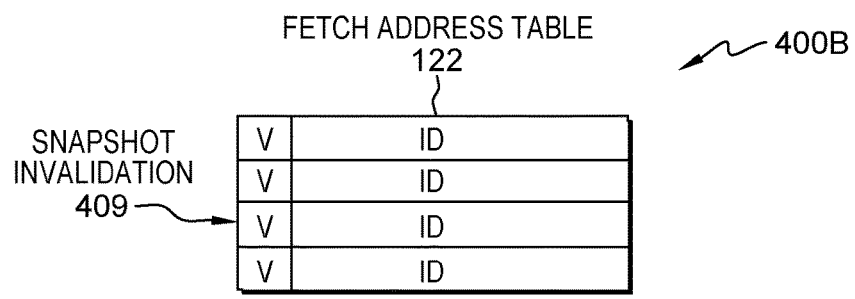
Figure 4C:
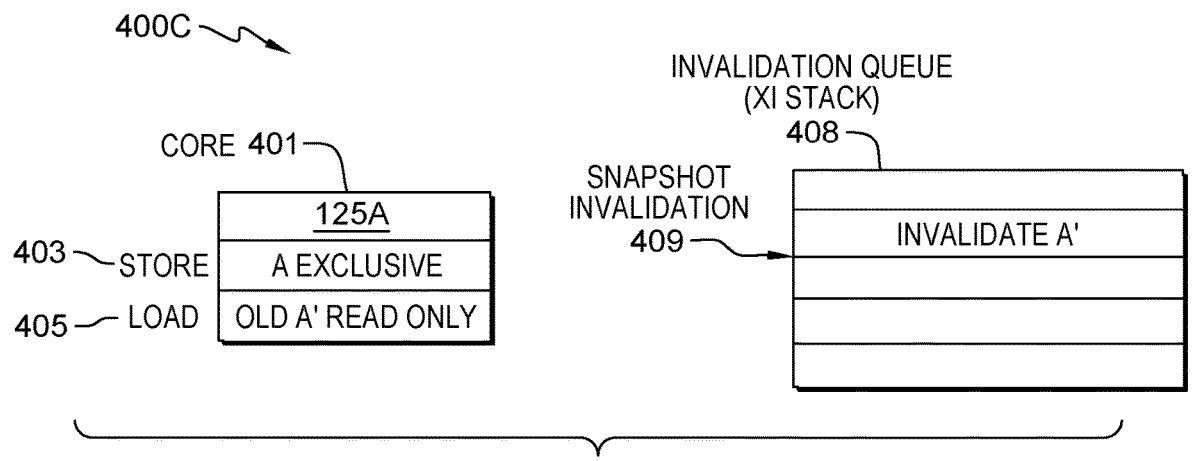

FIGS. 4A, 4B, and 4C, respectively, contain illustrations 400A, 400B, and 400C, each depicting a plurality of XI problems (i.e., tunneling (i.e., FIG. 4A) and SHL (i.e., FIG. 4C)) and corresponding solutions (FIGS. 4B and 4C) provided by the present invention, in accordance with an embodiment of the present invention. Illustration 400A contains core 401 and 402, respectively comprising L1 126A and L1 126B. Further, core 402 is running a program comprising load 405, 406, and 407, each representing operations or data from main memory to a register and respectively. For purposes of this example, load 405 is architecturally older than load 406, which is architecturally older than load 407. Core 401 is running a program comprising store 403 and 404, each representing operations or data from a register to main memory. For purposes of this example, store 403 is architecturally older than store 404. In addition, illustration 400A comprises invalidation queue (XI Stack) 408 for core 402 comprising a plurality of pending or delayed cache invalidations detailing potential stale cache entries conditioned to data mutations or changes. If a cache invalidation gets mishandled, it may indefinitely leave inconsistent values in the cache. Here, if load 405 gets new data, architecturally, load 406 must also get new data. Load 405 and 407 have the same physical address but differing virtual addresses. In an exemplary sequence, load 406 executes out-of-order on core 402 first, and receives a value for A that does not include the updated value from store 403 (Old A). Subsequently, store 403 executes on core 401, causing an invalidation for line A to be placed in the XI invalidation queue (XI stack) 408. Store 404 also occurs on core 401, but for purposes of this example does not require invalidation in core 402 because core 402 had not previously fetched line B. Subsequently, load 407 executes speculatively: sending a second fetch to a shared L3 while hitting within the L3 with a line (B) that had been updated by another core (i.e., store 404) so a resp_sync indication is sent to core 402. In this sequence, load 407 must ensure that snapshot indication 409, comprising invalidate A, has been processed in order to maintain coherency before completing load 407. Next, load 405 executes, missing in L1 126B because it has a different virtual address, and fetching line B from L3 121. Here, L3 121 utilizes FAT 122, as depicted in 400B, to ensure that load 405 performs an XI snapshot, if the XI snapshot for load 407 has not yet completed. This ensures that load 406 receives the updated data. The states of the L1 126A and L1 126B for cores 401 and 402, as well as of Invalidation Queue (XI Stack) 408 shown in FIG. 4A show associated states after speculative execution of load 405 in this sequence. FAT 122 is further described in the description of FIG. 1.

FIG. 4C depicts illustration 400C containing a SHL example, where core 401 fetches and requests authority to store (FEX) to a line that it has previously fetched. Illustration 400C comprises core 401 containing L1 126A executing a program consisting of store 403 and load 405. In illustration 400C, Invalidation Queue (XI Stack) 408 is associated with core 401. Here, store 403 comprises an exclusive line and load 405 comprises an old read only line. Load 405 must get new data from store 403, wherein load 405 and store 403 have the same physical address, but different virtual addresses. In illustration 400C, store 403 and load 405 are located in different L1 126 locations. In an exemplary sequence, load 405 executes out-of-order first and fetches old data for line A prior to execution of store 403. Subsequently, store 403 executes and core 401 sends a FEX request to the L3. Responsively, the L3 sends read-only XI to core 401 in order to invalidate the old value of A speculatively fetched by load 405 for core 401. Responsively, L3 121 sends the fetch response for the FEX for store 403 from L3 to core 401. Here, L3 121 ensures that store 403 receives new data for load 405 by sending resp_sync indication on FEX that causes an ROI. Responsively, core 401 initiates an XI snapshot that prevents load 405 from being able to use old, stale data.

Figure 5:
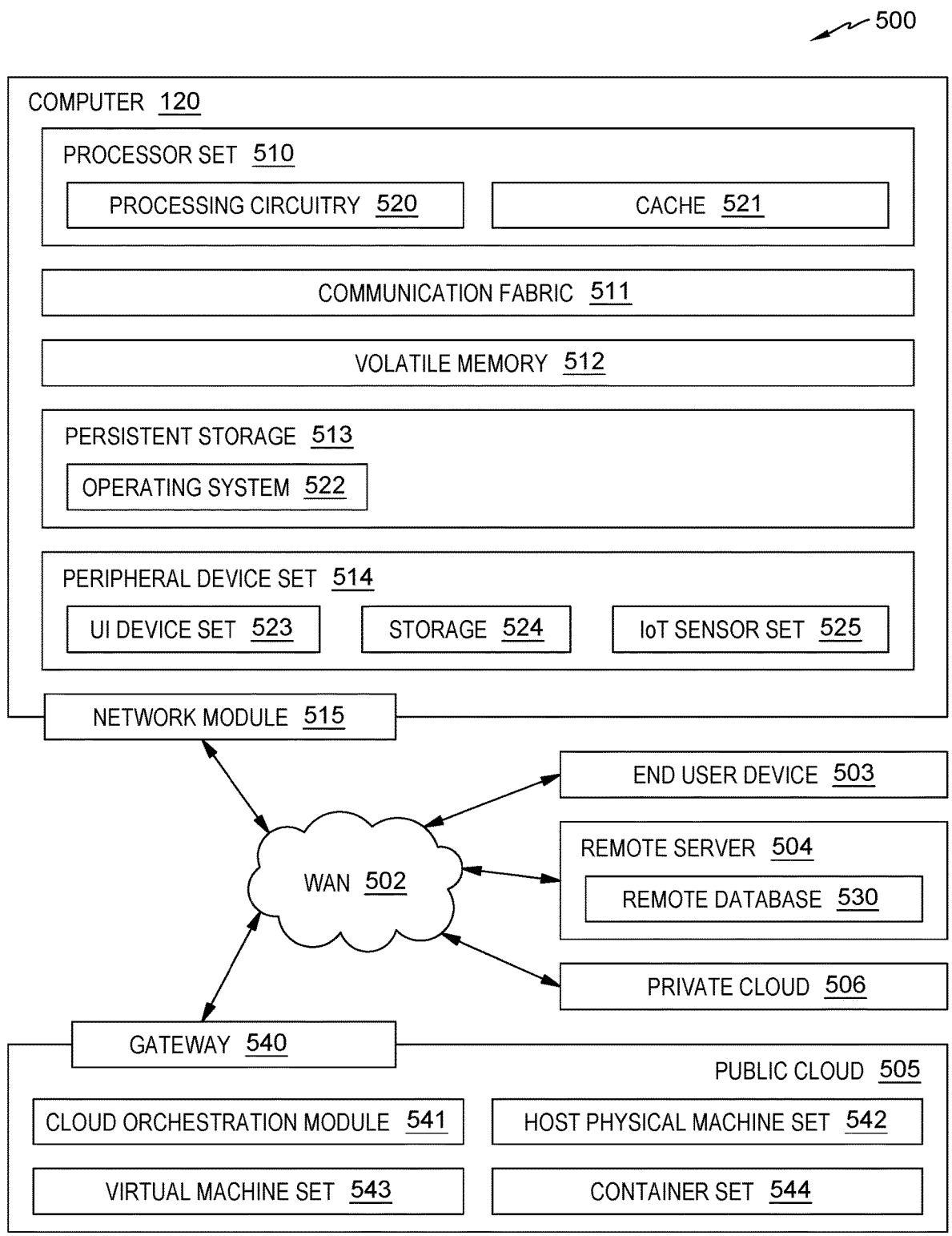
FIG. 5 is a block diagram of components of the server computer, in accordance with an embodiment of the present invention.

FIG. 5 depicts block diagram 500 illustrating components of computer 120 in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, defragmentation, or garbage collection, but this does not render the storage device as transitory because the data is not transitory while it is stored.

SMP environment 500 contains an example of an environment for the execution of at least some of the computer logic involved in performing the inventive methods, such as lower-level cache 121 and high-level cache 126. In addition, SMP 500 includes, for example, computer 120 (i.e., server computer 120), wide area network (WAN) 502, end user device (EUD) 503, remote server 504, public cloud 505, and private cloud 506. In this embodiment, computer 120 includes processor set 510 (including processing circuitry 520 and cache 521), communication fabric 511, volatile memory 512, persistent storage 513 (including operating system 522), peripheral device set 514 (including user interface (UI), device set 523, storage 524, and Internet of Things (IoT) sensor set 525), and network module 515. Remote server 504 includes remote database 530. Public cloud 505 includes gateway 540, cloud orchestration module 541, host physical machine set 542, virtual machine set 543, and container set 544.

Computer 120 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network, or querying a database, such as remote database 530. As is well understood in the art of computer technology, and depending upon the technology, performance of a computer-implemented method may be distributed among multiple computers and/or between multiple locations. On the other hand, in this presentation of SMP 500, detailed discussion is focused on a single computer, specifically computer 120, to keep the presentation as simple as possible. Computer 120 may be located in a cloud, even though it is not shown in a cloud in FIG. 5. On the other hand, computer 120 is not required to be in a cloud except to any extent as may be affirmatively indicated.

Processor set 510 includes one, or more, computer processors of any type now known or to be developed in the future. Processing circuitry 520 may be distributed over multiple packages, for example, multiple, coordinated integrated circuit chips. Processing circuitry 520 may implement multiple processor threads and/or multiple processor cores. Cache 521 is memory that is located in the processor chip package(s) and is typically used for data or code that should be available for rapid access by the threads or cores running on processor set 510. Cache memories are typically organized into multiple levels depending upon relative proximity to the processing circuitry. Alternatively, some, or all, of the cache for the processor set may be located "off chip". In some computing environments, processor set 510 may be designed for working with qubits and performing quantum computing. In an embodiment, cache 512 comprises L3 121 or L1 126.

Computer readable program instructions are typically loaded onto computer 120 to cause a series of operational steps to be performed by processor set 510 of computer 120 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 521 and the other storage media discussed below. The program instructions, and associated data, are accessed by processor set 510 to control and direct performance of the inventive methods. In SMP environment 500, at least some of the instructions for performing the inventive methods may be stored in persistent storage 513.

Communication fabric 511 is the signal conduction paths that allow the various components of computer 120 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 512 is any type of volatile memory now known or to be developed in the future. Examples include dynamic type random access memory (RAM) or static type RAM. Typically, the volatile memory is characterized by random access, but this is not required unless affirmatively indicated. In computer 120, the volatile memory 512 is located in a single package and is internal to computer 120, but, alternatively or additionally, the volatile memory may be distributed over multiple packages and/or located externally with respect to computer 120.

Persistent storage 513 is any form of non-volatile storage for computers that is now known or to be developed in the future. The non-volatility of this storage means that the stored data is maintained regardless of whether power is being supplied to computer 120 and/or directly to persistent storage 513. Persistent storage 513 may be a read only memory (ROM), but typically at least a portion of the persistent storage allows writing of data, deletion of data and re-writing of data. Some familiar forms of persistent storage include magnetic disks and solid-state storage devices. Operating system 522 may take several forms, such as various known proprietary operating systems or open-source Portable Operating System Interface type operating systems that employ a kernel. The code included typically includes at least some of the computer code or processor circuit logic involved in performing the inventive methods.

Peripheral device set 514 includes the set of peripheral devices of computer 120. Data communication connections between the peripheral devices and the other components of computer 120 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 523 may include components such as a display screen, speaker, microphone, wearable devices (such as goggles and smart watches), keyboard, mouse, printer, touchpad, game controllers, and haptic devices. Storage 524 is external storage, such as an external hard drive, or insertable storage, such as an SD card. Storage 524 may be persistent and/or volatile. In some embodiments, storage 524 may take the form of a quantum computing storage device for storing data in the form of qubits. In embodiments where computer 120 is required to have a large amount of storage (for example, where computer 120 locally stores and manages a large database) then this storage may be provided by peripheral storage devices designed for storing very large amounts of data, such as a storage area network (SAN) that is shared by multiple, geographically distributed computers. IoT sensor set 525 is made up of sensors that can be used in Internet of Things applications. For example, one sensor may be a thermometer and another sensor may be a motion detector.

Network module 515 is the collection of computer software, hardware, and firmware that allows computer 120 to communicate with other computers through WAN 502. Network module 515 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 515 are performed on the same physical hardware device. In other embodiments (for example, embodiments that utilize software-defined networking (SDN)), the control functions and the forwarding functions of network module 515 are performed on physically separate devices, such that the control functions manage several different network hardware devices. Computer readable program instructions for performing the inventive methods can typically be downloaded to computer 120 from an external computer or external storage device through a network adapter card or network interface included in network module 515.

WAN 502 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 503 is any computer system that is used and controlled by an end user (for example, a customer of an enterprise that operates computer 120) and may take any of the forms discussed above in connection with computer 120. EUD 503 typically receives helpful and useful data from the operations of computer 120. For example, in a hypothetical case where computer 120 is designed to provide a recommendation to an end user, this recommendation would typically be communicated from network module 515 of computer 120 through WAN 502 to EUD 503. In this way, EUD 503 can display, or otherwise present, the recommendation to an end user. In some embodiments, EUD 503 may be a client device, such as thin client, heavy client, mainframe computer, desktop computer and so on.

Remote server 504 is any computer system that serves at least some data and/or functionality to computer 120. Remote server 504 may be controlled and used by the same entity that operates computer 120. Remote server 504 represents the machine(s) that collect and store helpful and useful data for use by other computers, such as computer 120. For example, in a hypothetical case where computer 120 is designed and programmed to provide a recommendation based on historical data, then this historical data may be provided to computer 120 from remote database 530 of remote server 504.

Public cloud 505 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 505 is performed by the computer hardware and/or software of cloud orchestration module 541. The computing resources provided by public cloud 505 are typically implemented by virtual computing environments that run on various computers making up the computers of host physical machine set 542, which is the universe of physical computers in and/or available to public cloud 505. The virtual computing environments (VCEs) typically take the form of virtual machines from virtual machine set 543 and/or containers from container set 544. It is understood that these VCEs may be stored as images and may be transferred among and between the various physical machine hosts, either as images or after instantiation of the VCE. Cloud orchestration module 541 manages the transfer and storage of images, deploys new instantiations of VCEs and manages active instantiations of VCE deployments. Gateway 540 is the collection of computer software, hardware, and firmware that allows public cloud 505 to communicate through WAN 502.

Some further explanation of virtualized computing environments (VCEs) will now be provided. VCEs can be stored as "images". A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 506 is similar to public cloud 505, except that the computing resources are only available for use by a single enterprise. While private cloud 506 is depicted as being in communication with WAN 502, in other embodiments a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 505 and private cloud 506 are both part of a larger hybrid cloud.

What is claimed is:

1. A computer-implemented method comprising:
managing, by a lower-level cache and a higher-level cache, cross-core invalidation (XI) snapshots in a shared-memory multiprocessing system, wherein the management of XI snapshots reduces an amount of required snapshots while allowing shared lower-level caches, comprising:
maintaining, by the lower-level cache, a respective response sync state for at least one processor in a plurality of processors signifying that a line may have been changed by another processor since last fetched by a requesting processor.

2. The computer-implemented method of claim 1, further comprising:
responsive to processing a fetch for the line and the response sync state is set, providing, by the lower-level cache, a response sync indication to the higher-level cache; and
responsive to the fetch returning to the higher-level cache with the provided set response sync indication, executing, by the higher-level cache, an XI snapshot.

3. The computer-implemented method of claim 2, further comprising:
maintaining, by the lower-level cache, the respective response sync state for each processor in the plurality of processors signifying that the line may have been changed by another processor since last fetched by the requesting processor;
responsive to the line brought into the lower-level cache and not simultaneously returned to the higher-level cache, setting, by the lower-level cache, the response sync state; and
responsive to the line brought into the lower-level cache and delivered to a single computer processor, setting, by the lower-level cache, the response sync state for each processor in the plurality of processors excluding the requesting processor while unsetting the response sync state for the requesting processor.

4. The computer-implemented method of claim 3, further comprising:
responsive to the line being modified by one or more processors, setting, by the lower-level cache, the response sync state for each processor in the plurality of processors excluding the requesting processor.

5. The computer-implemented method of claim 2, further comprising:
a fetch address registers (FAR) address table (FAT) comprising a higher-level cache entry for every fetch returned from the lower-level cache, wherein the higher-level cache entry comprises a validation parameter and a lower-level cache identifier, wherein the higher-level cache entry is valid if an associated higher-level cache FAR is valid and the response sync indication was sent for that the associated higher-level cache FAR.

6. The computer-implemented method of claim 5, further comprising:
responsive to a hit in the lower-level cache in response to the fetch by the requesting processor, determining, by the lower-level cache, whether the fetch has a FAT hit based on a match of a lower-level cache identifier of the fetch and a lower-level cache identifier associated with the entry and whether the entry is valid;
responsive to the FAT hit and a valid entry, returning, by the lower-level cache, the lower-level cache fetch to the higher-level cache with a set response sync indication; and
responsive to a FAT miss and an invalid entry, returning, by the lower-level cache, the lower-level cache fetch to the higher-level cache with an unset or false response sync indication.

7. The computer-implemented method of claim 2, further comprising:
responsive to the requesting processor fetching and requesting authority (FEX) to store a line that was previously fetched, returning, by the lower-level cache, the response sync indication to the higher-level cache; and
responsive to the returned response sync indication, XI snapshotting, by the higher-level cache, to ensure the fetch does not consume stale data after store completion.

8. The computer-implemented method of claim 5, wherein the lower-level cache identifier is an absolute address, hashed absolute address, or lower-level cache location.

9. A computer hardware product comprising:
one or more computer readable storage media and program instructions stored on the one or more computer readable storage media, the stored program instructions comprising:
program instructions to manage cross-core invalidation (XI) snapshots in a shared-memory multiprocessing system, wherein the management of XI snapshots reduces an amount of required snapshots while allowing shared lower-level caches, comprising:
program instructions to maintain a respective response sync state for at least one processor in a plurality of processors signifying that a line may have been changed by another processor since last fetched by a requesting processor.

10. The computer hardware product of claim 9, wherein the program instructions, stored on the one or more computer readable storage media, further comprise:
program instructions to, responsive to processing a fetch for the line and the response sync state is set, provide a response sync indication to the higher-level cache; and
program instructions to, responsive to the fetch returning to the higher-level cache with the provided set response sync indication, execute an XI snapshot.

11. The computer hardware product of claim 10, wherein the program instructions, stored on the one or more computer readable storage media, further comprise:
program instructions to maintain the respective response sync state for each processor in the plurality of processors signifying that the line may have been changed by another processor since last fetched by the requesting processor;
program instructions to, responsive to the line brought into the lower-level cache and not simultaneously returned to the higher-level cache, set the response sync state; and
program instructions to, responsive to the line brought into the lower-level cache and delivered to a single computer processor, set the response sync state for each processor in the plurality of processors excluding the requesting processor while unsetting the response sync state for the requesting processor.

12. The computer hardware product of claim 11, wherein the program instructions, stored on the one or more computer readable storage media, further comprise:
program instructions to, responsive to the line being modified by one or more processors, set the response sync state for each processor in the plurality of processors excluding the requesting processor.

13. The computer hardware product of claim 10, wherein the program instructions, stored on the one or more computer readable storage media, further comprise:
a fetch address registers (FAR) address table (FAT) comprising a higher-level cache entry for every fetch returned from the lower-level cache, wherein the higher-level cache entry comprises a validation parameter and a lower-level cache identifier, wherein the higher-level cache entry is valid if an associated higher-level cache FAR is valid and the response sync indication was sent for that the associated higher-level cache FAR.

14. The computer hardware product of claim 10, wherein the program instructions, stored on the one or more computer readable storage media, further comprise:
program instructions to, responsive to the requesting processor fetching and requesting authority (FEX) to store a line that was previously fetched, return the response sync indication to the higher-level cache; and program instructions to, responsive to the returned response sync indication, XI snapshot to ensure the fetch does not consume stale data after store completion.

15. A computer system comprising:
one or more computer processors;
one or more computer readable storage media; and
program instructions stored on the computer readable storage media for execution by at least one of the one or more processors, the stored program instructions comprising:
  program instructions to manage cross-core invalidation (XI) snapshots in a shared-memory multiprocessing system, wherein the management of XI snapshots reduces an amount of required snapshots while allowing shared lower-level caches, comprising:
    program instructions to maintain a respective response sync state for at least one processor in a plurality of processors signifying that a line may have been changed by another processor since last fetched by a requesting processor.

16. The computer system of claim 15, wherein the program instructions stored, on the one or more computer readable storage media, further comprise:
  program instructions to, responsive to processing a fetch for the line and the response sync state is set, provide a response sync indication to the higher-level cache; and
  program instructions to, responsive to the fetch returning to the higher-level cache with the provided set response sync indication, execute an XI snapshot.

17. The computer system of claim 16, wherein the program instructions stored, on the one or more computer readable storage media, further comprise:
  program instructions to maintain the respective response sync state for each processor in the plurality of processors signifying that the line may have been changed by another processor since last fetched by the requesting processor;
  program instructions to, responsive to the line brought into the lower-level cache and not simultaneously returned to the higher-level cache, set the response sync state; and
  program instructions to, responsive to the line brought into the lower-level cache and delivered to a single computer processor, set the response sync state for each processor in the plurality of processors excluding the requesting processor while unsetting the response sync state for the requesting processor.

18. The computer system of claim 17, wherein the program instructions stored, on the one or more computer readable storage media, further comprise:
  program instructions to, responsive to processing a fetch for the line and the response sync state is set, provide a response sync indication to the higher-level cache; and
  program instructions to, responsive to the fetch returning to the higher-level cache with the provided set response sync indication, execute an XI snapshot.

19. The computer system of claim 18, wherein the program instructions stored, on the one or more computer readable storage media, further comprise:
  program instructions to, responsive to the line brought into the lower-level cache and not simultaneously returned to the higher-level cache, set the response sync state; and
  program instructions to, responsive to the line brought into the lower-level cache and delivered to a single computer processor, set the response sync state for each processor in the plurality of processors excluding the requesting processor while unsetting the response sync state for the requesting processor.

20. The computer system of claim 16, wherein the program instructions stored, on the one or more computer readable storage media, further comprise:
  a fetch address registers (FAR) address table (FAT) comprising a higher-level cache entry for every fetch returned from the lower-level cache, wherein the higher-level cache entry comprises a validation parameter and a lower-level cache identifier, wherein the higher-level cache entry is valid if an associated higher-level cache FAR is valid and the response sync indication was sent for that the associated higher-level cache FAR.

* * * * *